March 31, 1936.     R. LANGMAN     2,036,152
EASILY REMOVABLE WASHER
Filed Oct. 11, 1935
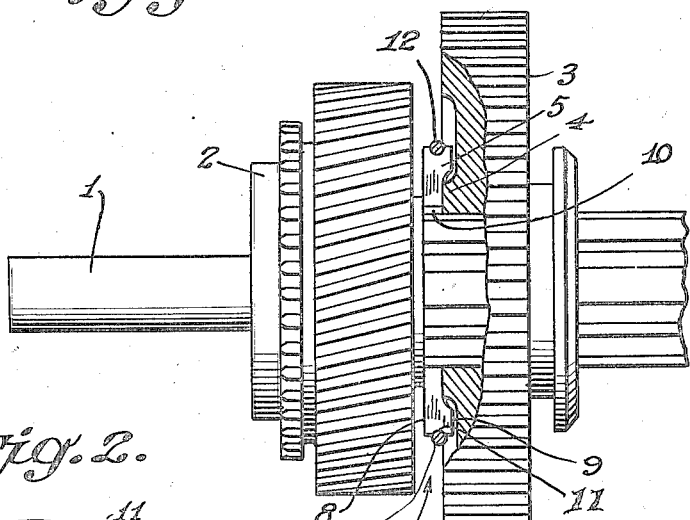
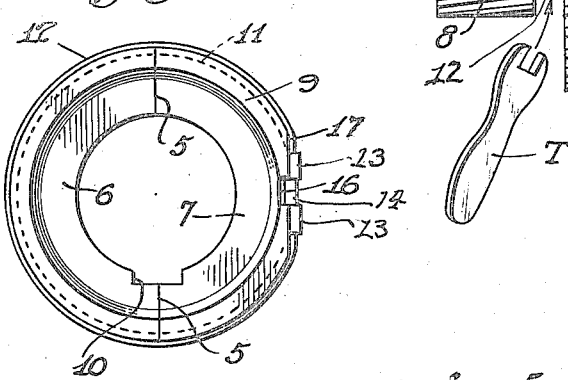
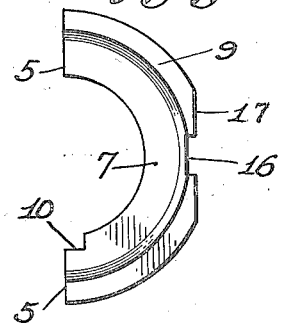
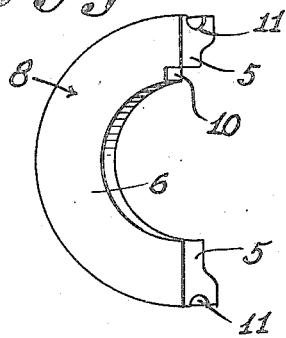
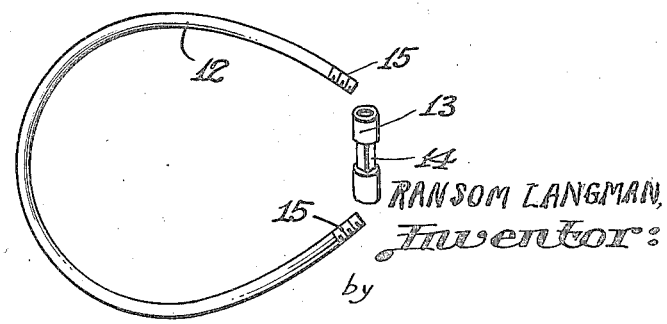
RANSOM LANGMAN, Inventor:
by Lester L. Sargent
Attorney Patented Mar. 31, 1936

2,036,152

UNITED STATES PATENT OFFICE 2,036,152

EASILY REMOVABLE WASHER

Ransom Langman, Dunmore, Pa.

Application October 11, 1935, Serial No. 44,598

3 Claims. (Cl. 85—51)

The object of my invention is to provide a novel and easily removable thrust washer for use primarily on transmission mechanism to replace the thrust washer heretofore in use, whereby to greatly facilitate the dissembling of the transmission for the making of repairs, and to permit of easily replacing a broken washer with a new washer.

It is also an object of my invention to provide a washer with an enlarged rim portion whereby to increase the strength of the washer. It is also an object of my invention to provide novel means for readily removing a split washer from the shaft on which it is mounted. I attain these and other objects of my invention by the device illustrated in the accompanying drawing, in which—

Figure 1 is a side elevation of a portion of the transmission mechanism with one of the two halves of the washer in place and shown in elevation, and with the wire 12 shown in section and a portion of the gear 3 broken away and shown in section;

Fig. 2 is a plan view of my washer;

Fig. 3 is a perspective view of one-half of the washer without the wire 12;

Fig. 4 is a view of the other half of the washer from that shown in Fig. 3 and viewed from the reverse side from that shown in Fig. 3; and Fig. 5 is a plan view of wire 12 and turnbuckle or coupling 13.

Like numerals designate like parts in each of the several views.

Referring to the accompanying drawing, there is illustrated conventional transmission mechanism containing a solid shaft 1, a hub gear 2 and intermediate gear 3. In place of the usual solid washer with key and spring pin, I provide a split washer consisting of the arms 6 and 7 the ends 5 of which abut and match as shown in Fig. 2. The face 8 of the washer is flat, as shown in Fig. 3, while the reverse face has an enlarged rim portion 9, as shown in Figs. 1, 2 and 4. The two halves of the washer are recessed at 10, as shown. The halves of the washer are provided with a peripheral groove 11 on which is seated the wire ring 12, which is provided with threaded ends 15, as shown in Fig. 5. I provide a coupling or turnbuckle 13 interiorly threaded to have threaded engagement with the reversely threaded ends 15. The turnbuckle has a squared portion 14, as shown, to permit of its being engaged by a suitable small wrench T to tighten or loosen the wire which encircles the halves of the washer. The half washer member 7 is cut away at 17 to permit of the ends 15 of the ring 12 being bent, as shown in Fig. 2, to a position to align with and engage in the respective ends of the turnbuckle 13, and a recess 16 is provided in the split washer member 7 opposite the squared portion 14 of the turnbuckle to facilitate operation of the turnbuckle by the wrench T.

In practice, when it is necessary or desirable to dissemble the transmission mechanism to replace a broken part, this can be readily done by turning the turnbuckle 13 by means of the wrench T, thus disengaging the reversely threaded ends 15 of wire 12 from the turnbuckle and permitting the wire to be taken off and the respective halves of the split washer removed. This is comparatively simple proceeding to the procedure required with a solid washer, such as heretofore in use, and which is held by a key that in turn is secured in place by a spring pin which cannot be readily released or operated and which often sticks.

Another advantage of my washer is that the rim of the washer is thick, as at 9, so as to project into the hollow concave side portion of the gear 3, as shown in Fig. 1, and which construction permits of making a stronger washer.

Another advantage of my device is that if the washer does become broken, the wire 12 will retain it in place and prevent a road failure of the transmission mechanism and will permit it to function even with a broken washer.

To install my washer it is only necessary to remove the cover of the transmission casing and make a change of washers, instead of removing the entire transmission mechanism, which is an eight to twelve hour job with transmissions having the conventional solid type of washers heretofore in general use.

It is within the contemplation of my invention to apply it to any suitable machines or mechanisms where a thrust washer is used and where it is difficult to remove a solid washer.

What I claim is:—

1. An easily removable washer of the type described, comprising a split washer having a peripheral groove, a wire ring mounted on the aforesaid groove, the ring having reversely threaded ends, and a turnbuckle releasably coupling said ends, one of the halves of the split washer having a portion cut away to receive the turnbuckle.

2. An easily removable washer of the type described, comprising a split washer having a peripheral groove, a wire ring mounted on the aforesaid groove, the ring having reversely threaded ends, a turnbuckle releasably connecting said ends, one of the halves of the split washer being recessed to receive the turnbuckle, the aforesaid turnbuckle having a squared central portion to permit of its being engaged and operated by a small wrench.

3. An easily removable washer of the type described comprising a split washer having a peripheral groove, a wire ring mounted on the aforesaid groove, the ring having reversely threaded ends, and a turnbuckle releasably connecting said ends, a portion of one of the halves of the split washer being cut away to receive the turnbuckle the respective halves of the split washer having a laterally thickened rim portion adjacent the periphery to increase the strength of the washer.

RANSOM LANGMAN.